INVENTOR
ROBERT W. HART

Jan. 10, 1956  R. W. HART  2,730,665
SIGNAL DETECTOR

Original Filed Sept. 27, 1951  4 Sheets-Sheet 2

INVENTOR
ROBERT W. HART
BY
ATTORNEYS

INVENTOR
ROBERT W. HART
ATTORNEYS

United States Patent Office 2,730,665
Patented Jan. 10, 1956

2,730,665

SIGNAL DETECTOR

Robert W. Hart, Lynn, Mass.

Original application September 27, 1951, Serial No. 248,625. Divided and this application May 20, 1953, Serial No. 356,322

6 Claims. (Cl. 318—128)

(Granted under Title 35, U. S. Code (1952), sec. 266)

This invention relates to signal detectors and, more particularly, to signal detectors employing a resonant system as an energy storage and accumulating means.

This application is a division of copending application, Serial No. 248,625, filed September 27, 1951, entitled Signal Detector.

The invention disclosed in my United States Patent No. 2,561,366 included one resonant system for imparting a periodicity to the signal or signals to be detected and a second resonant system for storing and accumulating the energy from the periodic signals. In such a signal detector it is essential that the two systems have and maintain the same resonant frequency. While it is possible to maintain the resonant frequencies of two systems sufficiently close together to provide a signal detector of greatly improved sensitivity, the maximum advantage of such a signal detector cannot be realized unless and until the two systems are held at exactly the same resonant frequency or until the necessity of maintaining the systems at the same resonant frequency is eliminated.

Therefore, it is an object of the present invention to provide a signal detector employing a resonant system for accumulating energy in which the problem of maintaining a fixed resonant frequency is eliminated.

It is a further object of the present invention to provide a signal detector in which a definite periodicity is imparted to received signals and in which the energy from the periodic signals is accumulated in a resonant system without the necessity of maintaining two resonant systems at the same resonant frequency.

A further object of the present invention is to provide a signal detector of simple construction and of relatively few parts.

In accordance with the preferred form of the invention, a single resonant system is employed to first impart the periodicity to the signal to be detected and then to store and accumulate the energy from the periodic signal. Preferably, but not necessarily, the resonant system is a tuning fork with means associated therewith for driving the tuning fork at constant amplitude and additional means for adding energy derived from the signal to be detected to the tuning fork to change the amplitude of oscillation of the tuning fork.

For a better understanding of the invention together with other and further objects thereof reference should be made to the following description and accompanying drawings in which.

Figure 1:
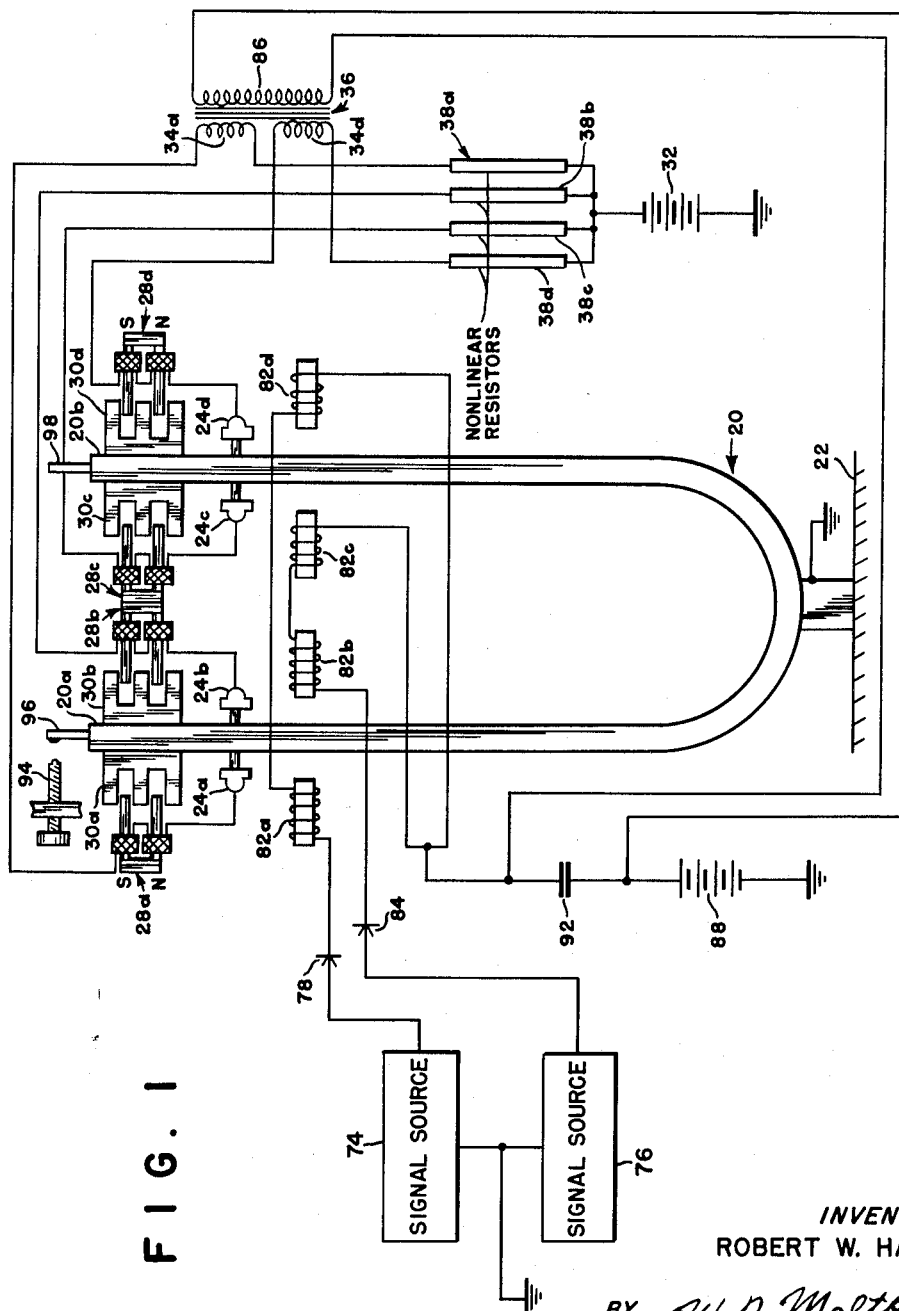
Fig. 1 is a partially schematic drawing of one preferred form of the invention.

In Fig. 1 a tuning fork 20 is rigidly mounted on a support schematically illustrated at 22. The natural frequency of tuning fork 20 should be in the low audio range, for example, twenty-five vibrations per second. To achieve maximum sensitivity the two arms of the tuning fork 20 should be identical and so proportioned as to minimize any tendency to vibrate at harmonics of the fundamental frequency. The drive system for the tuning fork includes four single button, inertia type carbon microphones 24a, 24b, 24c and 24d mounted on arms 20a and 20b of tuning fork 20. Microphones 24a and 24d are mounted on the outer sides of arms 20a and 20b respectively by the center button of the microphones. In a similar manner microphones 24b and 24c are mounted on the inside of arms 20a and 20b by their center buttons. Each of these microphones is so constructed that the normally high resistance of the microphone decreases as the arm on which it is mounted is accelerated in the direction of the microphone. Microphone 24a controls the current through the coils of magnetic drive unit 28a to which it is electrically connected. As will more fully appear from a reference to the description of Fig. 3 which follows, drive unit 28a is similar in many respects to the operating unit of a telephone receiver. The drive unit consists of a U-shaped, permanently magnetized pole piece on the arms of which twin signal coils are mounted. However, the arms of the U-shaped pole piece extend a considerable distance beyond the signal coils to enable the ends of these arms to enter slots in the armature 30a which is secured to arm 20a of tuning fork 20. For reasons that will be explained presently, the preferred position of armature 30a with tuning fork 20 at rest is with the ends of the U-shaped pole pieces just within the slots of armature 30a. The slots in armature 30a are so proportioned that the pole pieces of drive unit 28a will not contact armature 30a at any amplitude of oscillation of tuning fork 20.

Drive unit 28a is electrically connected to one terminal, here shown as the negative terminal, of current source 32 through the primary winding 34a of a transformer 36 and a limiting resistor illustrated at 38a.

Microphones 24b, 24c and 24d are similarly associated with drive units 28b, 28c and 28d respectively, and limiting resistors 38b, 38c and 38d respectively. The connection between drive unit 28d and limiting resistor 38d passes through the primary 34d on transformer 36. Armatures 30b, 30c and 30d are similar in construction to armature 30a.

The return circuit from the positive terminal of current source 32 to the center buttons of microphones 24a, 24b and 24c and 24d is made through a common connection to ground.

Transformer 36 forms part of the keying circuit for the signal detector and its function will be more fully explained in connection with a description of that circuit.

Figure 3A:
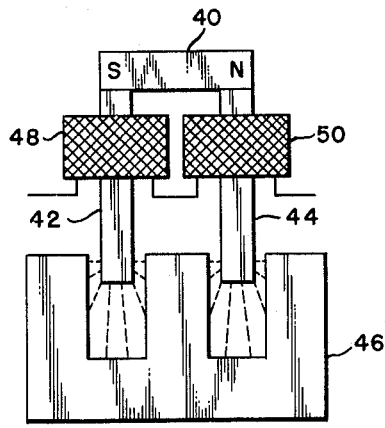
Figs. 3A, 3B and 3C illustrate in detail the magnetic units associated with the tuning fork.

Before proceeding to explain the operation of the drive system described above it will be advantageous to refer to Figs. 3 and 4 which show in greater detail the mechanical construction of drive unit 28a, 28b, 28c and 28d. As shown in Fig. 3A the drive units each comprise a U-shaped pole piece having a base 40 and arms 42 and 44. The cross-section of base 40 and arms 42 and 44 in planes perpendicular to the plane of Fig. 3A may be substantially rectangular with the shorter side of the rectangle lying in the plane of Fig. 3A and the longer side two to three times as long as the shorter side. Base 40 is permanently magnetized as indicated by the letters N and S which denote the north and south poles, respectively, of the magnet. Armature 46 is of magnetic material and has a dimension perpendicular to the plane of Fig. 3A which is substantially coextensive with arms 42 and 44. Signal coils 48 and 50 are closely wound about arms 42 and 44, respectively, and are preferably connected in series. It will be appreciated that the two coils could be replaced by a single coil if desired but it is thought that greater efficiency is obtained by placing a portion of the signal coil on each arm.

Figure 3B:
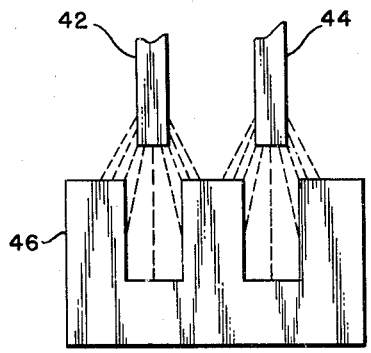
Figure 3C:
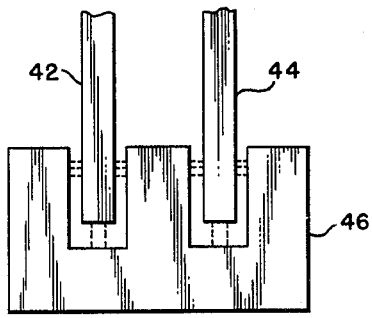

The preferred position of arms 42 and 44 when the tuning fork 20 is at rest is shown at Fig. 3A. As shown in this figure the ends of arms 42 and 44 are just within the slots in the armature 46. The dashed lines connecting arms 42 and 44 to armature 46 represent the magnetic field that exists in the air gap. It will be apparent from the disposition of these lines that the force of attraction between arms 42 and 44 and armature 46 is somewhat reduced by the fact that some of the lines are perpendicular to the line of movement of the armature 46. This will be more fully appreciated by reference to Figs. 3B and 3C which show two extreme positions of the armature 46 relative to the drive unit. In Fig. 3B with the arms 42 and 44 entirely outside the slots in armature 46 the lines of the magnetic field will be more nearly parallel to the line of movement of armature 46. The attraction will decrease, however, as the length of the air gap increases. From this it will be seen that the maximum pull is exerted on armature 46 at the instant arms 42 and 44 are about to enter their respective slots. As the arms 44 and 46 enter the slots the attractive force drops off rapidly until in the position illustrated in Fig. 3C the attractive force is nearly zero.

Figure 4:
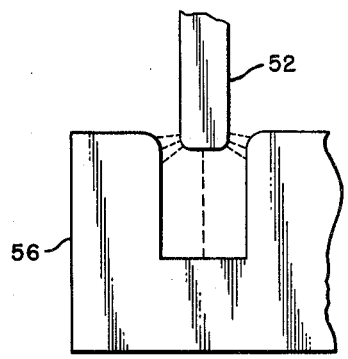
Figs. 4 and 5 illustrate possible modifications of the pole pieces and armatures of the units of Fig. 3.
Figure 5:
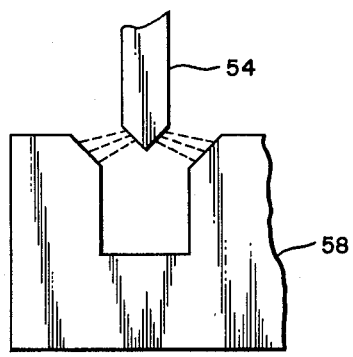

Figs. 4 and 5 illustrate modifications in the shape of the armature and the ends of the pole piece that may be employed to modify the forces exerted on the armature as it moves with respect to the drive unit. In Figs. 4 and 5, respectively, arms 52 and 54 correspond to arm 42 and armatures 56 and 58 correspond to armature 46 of Fig. 3A. In Fig. 4 the corners of the slot in armature 56 and the corners of the end of arm 52 are rounded slightly so that the driving force will not be reduced abruptly as the end of the arm 52 enters the slot in armature 56. By properly shaping these corners the curve of attractive force plotted against displacement may have the shape of a half sinusoid or any other desired shape. It will be understood that the above discussion of Figs. 3 and 4 assumes zero or constant current in signal coils 48 and 50. Variations in current in signal coils 48 and 50 will merely superimpose an additional variation in attractive force on the variation produced by displacement alone. In Fig. 5 the end of arm 54 and the outer extremity of the slot in armature 58 are chamfered instead of rounded. This modification will also tend to reduce the abruptness of the cutoff of the attractive force as arm 54 enters the slot in armature 58.

Figure 8:
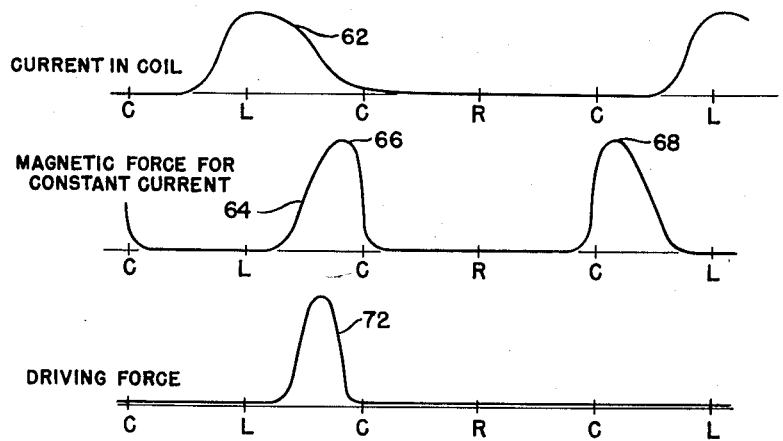
Fig. 8 shows selected waveforms illustrating the operation of the circuit of Fig. 1.

Now, referring once more to Fig. 1 and assuming that tuning fork 20 has been set into oscillation in any fashion, the operation of the drive system will now be explained. During the time that arms 20a and 20b are moving outwardly from their rest position and until they again reach their rest position the acceleration vector for the two arms is directed toward the center of the tuning fork 20. This will result in microphones 28b and 28c having a lower than normal resistance due to the fact that the inertia discs of these microphones lag the acceleration of the arms to which they are attached. In Fig. 8, curve 62 represents the current in driving unit 28b as a function of the displacement of arm 20a of Fig. 1. The letters C, L and R along the base line mark the center, extreme left and extreme right positions of arm 20a. It will be noted that the current rises sharply as the arm 20a reaches the left extreme of its excursion and then falls to substantially zero by the time the arm reaches its center or rest position. As the arm moves toward the right the vector of acceleration is toward the left. This decreases the pressure on microphone 24b which serves only to increase its already relatively high resistance.

Curve 64 of Fig. 8 represents the change in driving force with constant current through drive unit 28b. It will be noted that the peaks 66 and 68 in curve 64 occur when arm 20a is just to the left of center or just as the arms are about to enter the slots in armature 30b. The driving force exerted on armature 30b is shown in curve 72 of Fig. 8. As will be seen from Fig. 8 the peak of the driving force occurs at a position that will tend to aid the oscillation of tuning fork 20. The fact that the driving force occurs only when arm 20a is near its center position makes the drive system relatively independent of the amplitude of oscillation. Only one peak of any size will occur in curve 72 since peak 68 occurs at a time when there is no appreciable current flowing through drive unit 28b. The driving forces exerted by drive units 28a, 28c and 28d will be similar to that shown in curve 72 and will operate to drive tuning fork 20 in a push-pull manner. It should be obvious that either drive units 30a and 30d or 30b and 30c could be eliminated so that tuning fork 20 is driven only on the inward movement or outward movement respectively of arms 20a and 20b but it is believed that the push-pull drive will provide a more efficient and stable drive. The potential of current source 32 here shown as a battery may be selected such that the energy supplied each cycle is just sufficient to overcome the vibrational losses in tuning fork 20 at a preselected amplitude of oscillation. Nonlinear resistors 38a, 38b, 38c and 38d are provided to prevent an increase of driving force being applied in the event that a signal to be detected increases the amplitude of oscillation of fork 20 thus increasing the acceleration forces acting on microphones 24a, 24b, 24c and 24d. Resistors 38a, 38b, 38c and 38d should be of the type having a resistance that increases with increasing current and should be very stable. A thermistor of suitable characteristics is one example of a current limiter that might be employed.

Having described the manner in which tuning fork 20 is driven at a constant amplitude, the portion of the circuit for introducing the signal to be detected will now be described. In the embodiment of the invention illustrated in Fig. 1, the signal to be detected is picked up or derived from signal sources 74 and 76. Signal source 74 is connected through a rectifier 78 to auxiliary drive coil 82a. Connected in series with auxiliary drive coil 82a is a second auxiliary drive coil 82d located adjacent arm 20b. Similarly signal source 76 is connected through a rectifier 84 to auxiliary drive coil 82b which has auxiliary drive coil 82c in series therewith. The return leads of auxiliary drive coils 82c and 82d are through secondary 86 of transformer 36 and thence to bias source 88. Bypass capacitor 92 is connected across secondary 86.

The integration of a received signal is accomplished in a manner very similar to that described in connection with the reed integrator of my above-mentioned patent. Normally the bias supplied by bias source 88 is sufficient to prevent signals from signal sources 74 and 76 from passing rectifiers 78 and 84. However, when a pulse of current passes through primary 34a, the signal developed in secondary 86 will reduce the bias and permit a signal to be applied through rectifiers 78 and 84 to auxiliary drive coils 82a, 82b, 82c and 82d. Primary winding 34d is provided to maintain the symmetry in the drive circuit. The signals from signal sources 74 and 76 respectively are applied differentially and simultaneously to both arms 20a and 20b. The difference if any between signals from signal sources 74 and 76 will be applied as a resultant signal tending to increase or decrease the amplitude of oscillation of arms 20a and 20b depending on which signal is the larger. Assuming that the difference is in a direction to increase the amplitude of oscillation and persists for some time, the energy will be added to the tuning fork periodically and at its natural frequency of oscillation. This additional energy will cause the amplitude of oscillation to increase. An adjustable contact screw 94 is provided to make contact with a contact 96 mounted on arm 20a. Contact between contact 96 and contact screw 94 may be employed to operate a relay or similar device. A weight 98 is provided on arm 20b to maintain the symmetry of arms 20a and 20b.

In the event that the signals from sources 74 and 76 are such that from time to time the amplitude of vibration of the tuning fork 20 may be either increase or decrease it may be desirable to replace contact 96 and contact screw 94 with a suitable electronic vibration amplitude measuring device. Such a substitution may even be made where it is expected that tuning fork 20 may only vibrate at amplitudes equal to or greater than normal but where greater precision or sensitivity is required in indicating an increase in the amplitude of vibration.

The circuit described above compares the signals received from two sources, for example, two differently directed microphones and integrates the difference. One obvious modification of the circuit of Fig. 1 would be to eliminate one signal source and allow the tuning fork 20 to integrate the entire signal from the remaining source. In either case it is desirable to employ signal limiters so that the energy added to the tuning fork during any one cycle is limited.

Figure 2:
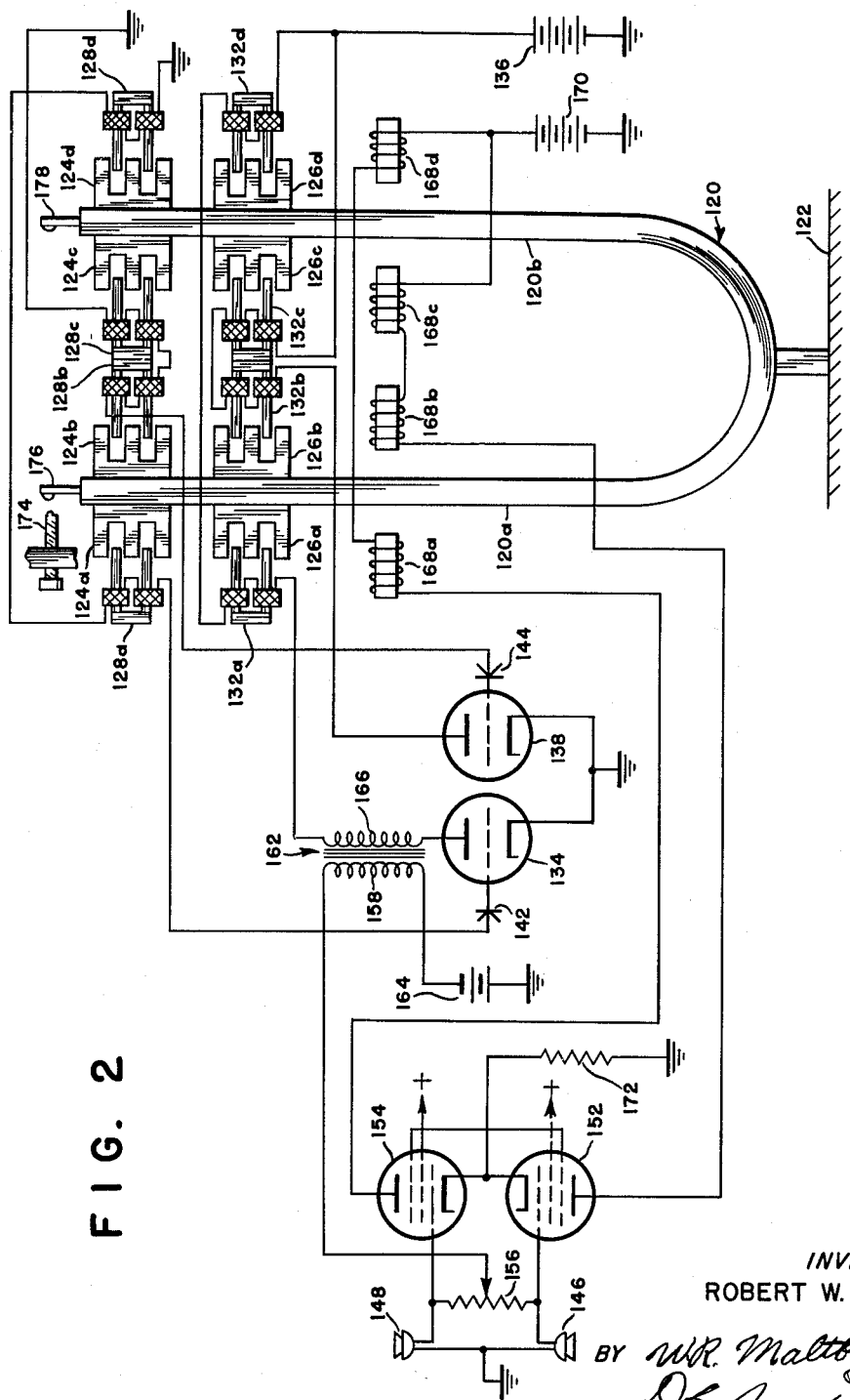
Fig. 2 is a partially schematic drawing of a second preferred form of the invention with a modified tuning fork drive circuit.

In the embodiment of the invention shown in Fig. 2, tuning fork 120 is rigidly mounted on a base 122. Mounted on the arms 120a and 120b of tuning fork 120 are two sets of four armatures which have been designated as armatures 124a, 124b, 124c and 124d and 126a, 126b, 126c and 126d respectively. Associated with the armatures of the 124 group are pick-up units 128a, 128b, 128c and 128d and associated with the armatures of the group having the initial number 126 are drive units 132a, 132b, 132c and 132d. Both the pick-up units and the drive units are identical to the drive units illustrated in Fig. 3A. The coils of drive units 132a and 132d are connected in series between the anode of electron tube 134 and anode potential source 136. Similarly the coils of drive units 132b and 132c are connected in series between the anode of tube 138 and anode potential source 136. The cathodes of tubes 134 and 138 and the negative terminal of source 136 are returned to ground. The coils of pick-up units 128a and 128d are connected in series between ground and a rectifier 142 which is connected to the grid of tube 134. In a similar manner the coils of pick-up units 128b and 128c are connected in series between ground and a rectifier 144 which is connected to the grid of tube 138.

Due to the fact that the yoke of pick-up units 128a, 128b, 128c and 128d are permanently magnetized there will be a change in the amount of flux linking the coils of these pick-up units as the armatures associated with the pick-up units are moved under the influence of the arms 120a and 120b. The maximum induced voltage resulting from this change in flux will occur at the time the ends of the arms of the pick-up unit yoke are entering or leaving the slots in the armature. The maximum negative voltage peaks occurring when the arms are leaving the slots are of the wrong phase for properly driving the tuning fork 120 through tubes 134 and 138 so they are excluded from tubes 134 and 138 by rectifiers 142 and 144. The desired voltage peaks will pass through rectifiers 142 and 144 since they are of the opposite polarity from the excluded peaks.

Since the coils of the pick-up units may be so connected that the undesired peaks are negative, an alternative method of eliminating these peaks would be to bias tubes 134 and 138 to approximately plate current cut-off.

The positive voltage peaks on the grids of tubes 134 and 138 result in pulses of current being supplied to the drive units 132a, 132b, 132c and 132d. These pulses of current drive the tuning fork at a constant amplitude in much the same fashion as the circuit of Fig. 1.

In Fig. 2 the signals to be integrated are obtained from sources 146 and 148 which in this example are differently directed microphones having one terminal at ground and second terminals respectively connected to the control grids of pentode amplifier tubes 152 and 154. The control grids of tubes 152 and 154 are connected together for balancing purposes by a resistor 156 which has an adjustable tap connected to ground through the secondary winding 158 of transformer 162 and a negative bias source 164. The pulses of anode current in tube 134 pass through the primary winding 166 of transformer 162 and thereby create positive voltage pulses in winding 158 which periodically overcome the negative bias supplied by source 164. The anode circuit for tube 154 includes auxiliary drive coils 168a and 168d in series with anode voltage source 170. The anode circuit of tube 152 includes auxiliary drive coils 168b and 168c and the same anode voltage source 170. The cathode return for tubes 152 and 154 is through resistor 172.

In the absence of a signal or with equal signals on microphones 146 and 148 the tap on resistor 156 is adjusted so that the forces exerted on arm 120a of tuning fork 120 by auxiliary drive coils 168a and 168b are exactly equal. Since the circuit is mechanically and electrically symmetrical, the forces exerted on arm 120b by auxiliary drive coils 168c and 168d will also be exactly equal. Thereafter, any difference in signals at microphones 146 and 148 will result in unbalanced forces being periodically applied to the two arms of the tuning fork 120 each time tubes 152 and 154 are gated on by the signal from secondary winding 158. Since these pulses occur at the natural frequency of tuning fork 120 they will result in an increased amplitude of oscillation of tuning fork 120. The fact that the amplitude of oscillation has increased may be indicated by placing a contact screw 174 a preselected distance from a contact 176 on arm 120a. Again, arm 120b should be counterbalanced by a weight 178 to preserve the symmetry of the tuning fork.

Figure 6:
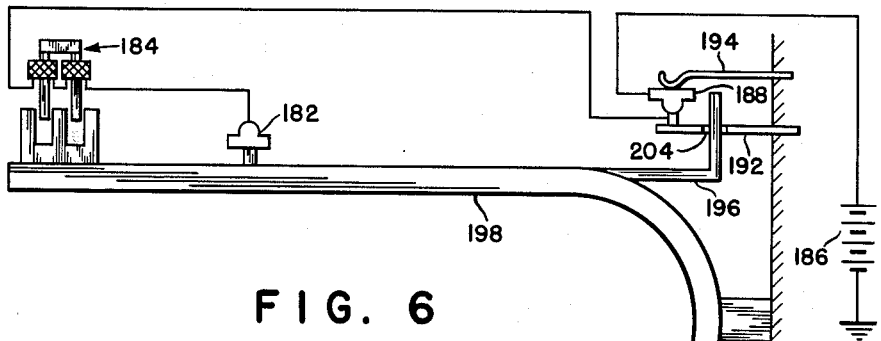
Fig. 6 illustrates one method of limiting the driving force applied to a tuning fork.

If the tuning fork being driven by a circuit of the type shown in Fig. 1 has vibrational losses that do not increase appreciably with increased amplitude of oscillation, the drive system may hold the tuning fork at any amplitude of oscillation it may reach. This is undesirable where intermittent signals are present which would normally only momentarily increase the amplitude of oscillation and then allow it to decay to its steady state. The circuit of Fig. 6 provides means for introducing additional resistance in the driving circuit at high amplitudes of oscillation. In Fig. 6, 182 is an inertia operated microphone and 184 is a drive unit of the type described in connection with Fig. 1. Connected in series between the coils of drive unit 184 and current source 186 is a pressure sensitive microphone button 188. Microphone button 188 is supported between springs 192 and 194 which normally exert sufficient pressure on microphone button 188 so that it has a relatively low resistance. Suitable electrical insulation may be provided between microphone button 188 and springs 192 and 194 and for purposes of mechanical support microphone button 188 may be connected to either one but not both of springs 192 and 194. A rigid arm 196 is secured to arm 198 of the tuning fork and extends to a position adjacent spring 194 through a suitable opening 204 in spring 192.

Figure 7:
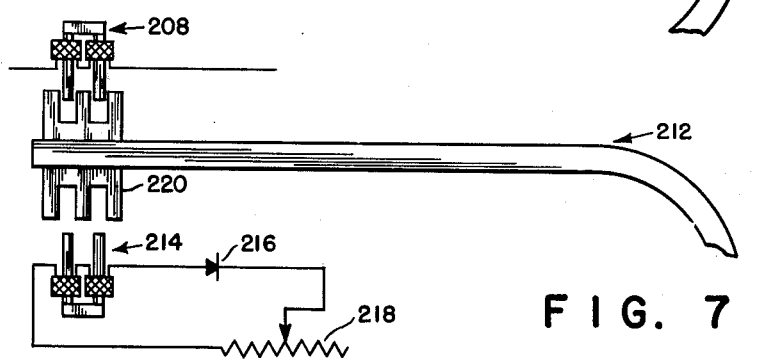
Fig. 7 illustrates a circuit for dynamically braking the vibration of a tuning fork.

At normal amplitudes of oscillation arm 196 does not contact spring 194. However, when the amplitude of oscillation of the tuning fork increases above its normal amplitude for any reason arm 196 lifts spring 194 by an amount proportional to the amplitude of oscillation and thus causes a proportional increase in the resistance of microphone button 188. This increase in resistance can be selected so that it exactly counterbalances any increase in driving force resulting from increased acceleration forces acting on inertia operated microphone 182. A second method of introducing additional losses at high amplitudes of oscillation is illustrated in Fig. 7. In Fig. 7, 208 represents the normal driving unit for tuning fork 212. A damping unit 214 which may be similar in construction to driving unit 208 is also positioned adjacent one or preferably both arms of the tuning fork. The coil of damping unit 208 is shunted by a rectifier 216 and an adjustable resistor 218 in series. The damping unit 214 is so positioned with respect to armature 220 that the arms of the U-shaped yoke do not enter the slots in armature 220 except when the tuning fork 212 is vibrating at greater than its normal amplitude. The circulating currents set up in the coil of damping unit 214 will be in a direction to set up a magnetic field that opposes the vibration of tuning fork 212. The amount of opposition may be controlled by adjusting resistor 218. Rectifier 216 limits the opposition to one direction of movement of the arm of tuning fork 212. If additional braking action is desired, rectifier 216 may be omitted.

An alternative braking device along the same general lines as that illustrated in Fig. 7 employs an auxiliary coil on driving unit 208 and connected in series with resistor 218 and rectifier 216. This circuit is actually a counter drive circuit since the current set up by unit 214 reduces the total magnetic flux set up in driving unit 208. Again, the reduction in driving force may be controlled by proper adjustment of resistor 218. In the circuit just described rectifier 216 is believed to be necessary to eliminate one-half of the signal from unit 214 which would be of the wrong polarity.

It will be understood that what has been described herein is what is at present believed to be the preferred embodiments of the present invention and that no attempt has been made to describe all of the numerous modifications and combinations that readily appear from a reading of the specification and fall within the scope of the hereinafter appended claims.

The invention described herein may be manufactured and used by or for the Government of the United States of America for governmental purposes without the payment of any royalty thereon or therefor.

What is claimed is:

1. In apparatus for driving a tuning fork at constant amplitude comprising a current source, an electromagnetic driving means magnetically associated with an arm of said tuning fork and an inertia operated microphone mounted on an arm of said tuning fork, said current source, said driving means and said microphone being connected in series circuit, means for limiting the net driving force applied to said tuning fork during each vibration, said last-mentioned means comprising a pressure sensitive microphone, means supporting said microphone, said supporting means including a spring member normally pressing on said microphone, a rigid arm secured to one arm of said tuning fork and adapted to contact said spring member upon the attainment by said tuning fork of a predetermined amplitude of oscillation, said rigid arm acting to reduce the pressure exerted by said spring member on said microphone and thereby increase the impedance of said microphone at amplitudes of vibration greater than said predetermined amplitude, said pressure sensitive microphone being connected in said series circuit to limit the current flowing therein.

2. In combination with a tuning fork, an armature mounted on the arm of said turning fork adjacent the free end of said arm, said armature having a pair of slots formed therein, a U-shaped, permanently magnetized yoke positioned adjacent said free end of said arms, and so spaced from said armature that the ends of said yoke enter said slots in a noncontacting relationship upon the attainment by said tuning fork of a predetermined amplitude of oscillation, a coil surrounding said yoke and a resistor shunting said coil, the magnetic forces generated by said combination serving to brake the vibration of said tuning fork.

3. A tuning fork drive unit comprising a magnetic armature secured to an arm of the tuning fork adjacent the free end thereof, said armature being formed with a pair of spaced slots, a U-shaped yoke of magnetic material rigidly supported adjacent said armature, said yoke being positioned so that the ends thereof enter said slots in a noncontacting relationship during a fraction of a vibration cycle, and a coil surrounding said yoke, a resistor, the magnitude of said resistor varying in accordance with the amount of pressure applied thereto, one end of said resistor being fixed and the other end secured to said arm whereby the magnitude of said resistor is cyclically varied in response to the vibration of said arm, said resistor and said coil being connected in a series relationship across a source of unidirectional voltage.

4. A tuning fork drive unit comprising a magnetic armature secured to an arm of the tuning fork adjacent the free end thereof, said armature being formed with a pair of spaced slots, a U-shaped yoke of magnetic material rigidly supported adjacent said armature, the ends of said yoke extending within said slots in a noncontacting relationship for a small fraction of the depth of said slots at the rest position of said tuning fork, and a signal coil surrounding said yoke, a pressure sensitive resistor, means for coupling said resistor to said arm such that the force applied to said resistor cyclically varies in response to the vibration of said arm, said resistor and said signal coil being energized in series from an unidirectional voltage source.

5. A tuning fork drive system comprising a magnetic armature secured to an arm of the tuning fork adjacent the free end thereof, said armature being formed with a pair of spaced slots, a U-shaped yoke of magnetic material rigidly supported adjacent said armature, the ends of said yoke extending within said slots in a noncontacting relationship for a small fraction of the depth of said slots at the rest position of said tuning fork, a signal coil surrounding said yoke and means for supplying a current pulse of said coil on each vibration of said tuning fork at the instant the ends of said yoke are about to enter said slots.

6. A tuning fork drive unit comprising first and second magnetic armatures secured to opposite sides of an arm of a tuning fork adjacent the free end thereof, said armatures being formed with a pair of spaced slots, first and second U-shaped yokes of magnetic material rigidly supported adjacent said armatures, each yoke being positioned so that the open end thereof enters into the slots of an armature in a noncontacting relationship during a part of the vibration cycle of said arm, coil means surrounding each yoke, a resistor, the magnitude of said resistor varying in response to the force applied thereto, one end of said resistor being rigidly supported adjacent said arm and the other end secured to said arm whereby the force applied to said resistor varies cyclically during the vibration cycle of said arm, said resistor and one of said coils being connected in series across a unidirectional voltage source and the other of said coils being shunted by a resistor.

References Cited in the file of this patent

UNITED STATES PATENTS

| | | |
|---|---|---|
| 1,907,745 | Curtis | May 9, 1933 |
| 2,034,787 | Williams | Mar. 24, 1936 |
| 2,302,983 | Swallow | Nov. 24, 1942 |
| 2,532,038 | Sebouh | Nov. 28, 1950 |
| 2,644,920 | Tierney | July 7, 1953 |